United States Patent
Lee et al.

(10) Patent No.: US 9,229,765 B2
(45) Date of Patent: Jan. 5, 2016

(54) GUARANTEE REAL TIME PROCESSING OF SOFT REAL-TIME OPERATING SYSTEM BY INSTRUCTING CORE TO ENTER A WAITING PERIOD PRIOR TO TRANSFERRING A HIGH PRIORITY TASK

(71) Applicant: SAMSUNG ELECTRONICS CO., LTD., Suwon-si (KR)

(72) Inventors: Hee Kuk Lee, Suwon (KR); Yoon Soo Kim, Suwon (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 390 days.

(21) Appl. No.: 13/712,198

(22) Filed: Dec. 12, 2012

(65) Prior Publication Data

US 2013/0152100 A1    Jun. 13, 2013

(30) Foreign Application Priority Data

Dec. 13, 2011    (KR) .......................... 10-2011-0133658

(51) Int. Cl.
*G06F 9/46*  (2006.01)
*G06F 9/48*  (2006.01)

(52) U.S. Cl.
CPC ............... *G06F 9/46* (2013.01); *G06F 9/4856* (2013.01)

(58) Field of Classification Search
CPC ... G06F 9/5094; G06F 9/5088; G06F 9/4806; G06F 9/505
See application file for complete search history.

(56) References Cited

U.S. PATENT DOCUMENTS

| | | | |
|---|---|---|---|
| 8,219,994 B2* | 7/2012 | Topaloglu | 718/102 |
| 8,832,174 B2* | 9/2014 | Shin et al. | 709/201 |
| 2004/0064673 A1* | 4/2004 | Rogers et al. | 711/207 |
| 2009/0064164 A1* | 3/2009 | Bose et al. | 718/105 |
| 2009/0089792 A1* | 4/2009 | Johnson et al. | 718/105 |
| 2009/0165014 A1* | 6/2009 | Park | 718/105 |

FOREIGN PATENT DOCUMENTS

| | | |
|---|---|---|
| JP | 2003-523561 | 8/2003 |
| JP | 2005-182223 | 7/2005 |
| KR | 10-2007-0037427 | 4/2007 |

OTHER PUBLICATIONS

Calandrino et al. "Soft Real-Time Scheduling on Performance Asymmetric Multicore Platforms", Real Time and Embedded Technology and Applications Symposium, 13th IEEE, Issue Date: Apr. 3-6, 2007.*

* cited by examiner

*Primary Examiner* — Meng An
*Assistant Examiner* — Wissam Rashid
(74) *Attorney, Agent, or Firm* — Harness, Dickey & Pierce, P.L.C.

(57) ABSTRACT

A method to guarantee real time processing of a soft real time operating system in a multicore platform by executing a thread while varying a core in which the thread is executed and apparatus are provided. The method includes assigning priority to a task thread, executing the task thread, determining a core in which the task thread is to be executed, and if the core is determined, transferring the task thread to the determined core.

9 Claims, 10 Drawing Sheets

GUARANTEE REAL TIME PROCESSING OF SOFT REAL-TIME OPERATING SYSTEM BY INSTRUCTING CORE TO ENTER A WAITING PERIOD PRIOR TO TRANSFERRING A HIGH PRIORITY TASK

CROSS-REFERENCE TO RELATED APPLICATIONS

This application is related to, and claims priority to, Korean Patent Application No. 10-2011-0133658, filed on Dec. 13, 2011 in the Korean Intellectual Property Office, the disclosure of which is incorporated herein by reference.

BACKGROUND

1. Field

Embodiments of the present invention relate to a software framework used in embedded systems, such as multicore- or manycore-based mobile devices, multimedia devices, and home devices.

2. Description of the Related Art

A Real-Time Operating System (RTOS) refers to an operating system that considers requirements of a real-time application program.

The RTOS executes an application program at an execution timing calculated, for example, by a developer or programmer of an application program.

The RTOS may be divided into a hard RTOS and a soft RTOS. The soft RTOS has an advantage that libraries and programs of a general purpose Operating System (OS) such as Windows or Linux can be used, but has a disadvantage that there may be will many jitters relative to the hard RTOS.

In the soft RTOS, it is important to reduce jitters to guarantee a real time processing corresponding to real time processing of the hard RTOS.

SUMMARY

It is an aspect of the present invention to provide a method to guarantee real time processing of a soft RTOS in a multicore platform by executing a thread while varying a core in which the thread is executed.

Additional aspects of the invention will be set forth in part in the description which follows and, in part, will be obvious from the description, or may be learned by practice of the invention.

In accordance with an aspect of the present invention, a method to guarantee real time processing of a soft real time operating system in a multicore platform includes assigning priority to a task thread, executing the task thread, determining a core in which the task thread is to be executed, and if the core is determined, transferring the task thread to the determined core.

If the task thread is transferred, the method may include waiting until an execution period of the task thread arrives, and if the execution period of the task thread arrives, executing the task thread in the determined core.

A wait interval until an execution period of the task thread arrives may include spinning or a combination of spinning and sleep.

Executing the task thread may include executing the task thread when a predetermined execution period of the task thread is started.

Determining the core in which the task thread is to be performed may include determining a core in which a task thread of a next period is to be performed according to a predetermined task thread arrangement scheme.

In accordance with an aspect of the present invention, a computer-readable recording medium in which a program to execute the method to guarantee real time processing of a soft real time operating system is recorded is provided.

In accordance with an aspect of the present invention, an apparatus to guarantee real time processing of a soft real time operating system in a multicore platform includes a first core configured to transfer a task thread having priority according to a predetermined task thread arrangement scheme, and a second core configured to receive the task thread transferred from the first core and execute the task thread when an execution period of the task thread arrives.

The second core may determine whether the execution period of the task thread arrives through spinning or a combination of spinning and sleep.

The first core may execute another thread if the task thread is transferred to the second core.

The second core may execute the task thread transferred from the first core and determine a core in which a task thread of a next period is to be executed according to the predetermined task thread arrangement scheme.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments of the present invention, examples of which are illustrated in the accompanying drawings, wherein like reference numerals refer to like elements throughout.

To multitask in a multicore platform, an OS assigns each task to be executed, for example, to a core and schedules each task according to priority.

A method to determine in which core a task is to be performed and assigning each task to a corresponding core may be divided into a static method and a dynamic method. Task migration in a multicore system is disclosed.

For task migration between cores, all information indicating a task execution state should be migrated to a next core from a previous core. Such state information includes not only register file information of a core used by a task, but also the contents of a memory used by a task.

A local memory, such as a Scratch Pad Memory (SPM), may be used with respect to each core in addition to a cache in a multicore platform.

Since consistency is usually not maintained by hardware in the SPM, data necessary for software in an application program or an OS should be fetched from a DRAM or other memories. The SPM occupies, for example, a few hundred kilo bytes (KB) according to hardware configuration and, therefore, it is important to reduce costs consumed to migrate the contents of a memory.

For migration of the contents of the memory, total copy, pre-copy, and demand paging methods have been conventionally used. Total copy may be defined a method to temporarily stop the execution of a task, migrate all information including the contents of a local memory, and then resume the execution of the task in a new core.

Pre-copy may be defined a method to perform both the execution of a task and the migration of the contents of a local memory until the number of modified pages of the local memory becomes under a given level and, if the number of modified pages of the local memory becomes under below the given level, stop the execution of the task, and transfer the contents of the local memory.

Demand paging may be defined a method to immediately transfer a task using a demand paging method of a virtual memory and copy the necessary contents of a memory whenever a page fault is generated.

Such migration of the contents of a memory may be used for fast task migration in a distributed system. Reduction of a task execution stop time using pre-loading of data of a task to be executed is disclosed according to scheduling in a multicore platform.

The total copy, pre-copy, and demand paging methods may be used in a distributed system in which real time is not demanded, but may be not suitable for multicore platforms.

In the total copy method, the execution of a task may be stopped for a long time because the execution of the task should be stopped while total contents of a local memory used by the task are copied.

In a pre-copy method, copies of the same contents of the local memory may be frequently made, thereby increasing overhead caused by memory copies. In a multicore platform, a process to store data for a task in an input buffer of a local memory, process the data, and store the data in an output buffer may be repeated. However, as the total contents of the memory are copied without considering the data, the data may be unnecessarily transferred. In a demand paging method, even though virtual memory hardware should be provided, an embedded system may not provide the hardware in most cases and thus it is difficult to use the demand paging method.

A method to pre-load data of a task to be performed according to scheduling in a multicore platform serves to improve performance by overlapping a loading time when the task is newly loaded with an execution time of a previous task and is different from migration of a task without stopping the task during the execution of the task.

Figure 1:
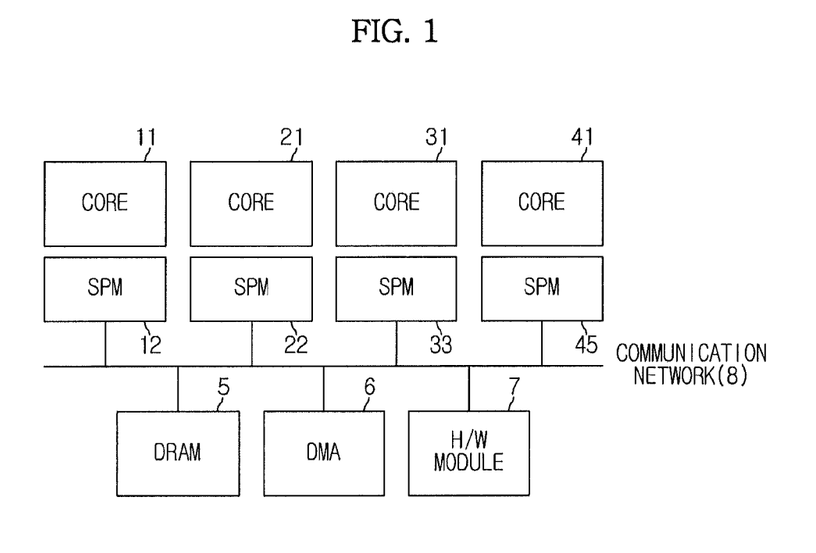
FIG. 1 and FIG. 2 illustrate exemplary multicore platforms.

FIG. 1 illustrates an exemplary multicore/manycore platform.

Referring to FIG. 1, the multicore/manycore platform to which an exemplary embodiment of the present invention may be applied includes a first core 11, a first SPM 12, a second core 21, a second SPM 22, a third core 31, a third SPM 33, . . . , an N-th core 41, an N-th SPM 45, a DRAM 5, a Direct Memory Access (DMA) 6, a hardware (H/W) module 7, and a communication network 8.

Each core shown in FIG. 1 may perform a specific task. The cores may be comprised of homogeneous cores or may be comprised of heterogeneous cores such as Central Processing Units (CPUs), Digital Signal Processors (DSPs), and Reconfigurable Processors (RPs).

Each core may have a local memory such as an SPM. Code and data necessary for executing a task may be stored in each core. That is, each core copies the code and data for the task in the local memory from the DRAM 5 and executes the task based on the code and data.

Each core may rapidly execute the task because it may quickly access the local memory compared with the DRAM 5. To migrate the task from one core to another, a current task execution state including the contents of the local memory may be transferred to a new core.

The H/W module 7 supports a function, for example, specific to the multicore/manycore platform. If the multicore/manycore platform is a video playback device, the H/W module 7 may be a video codec module. The communication network 8 connects the elements shown in FIG. 1 and may be implemented in bus form.

Figure 2:
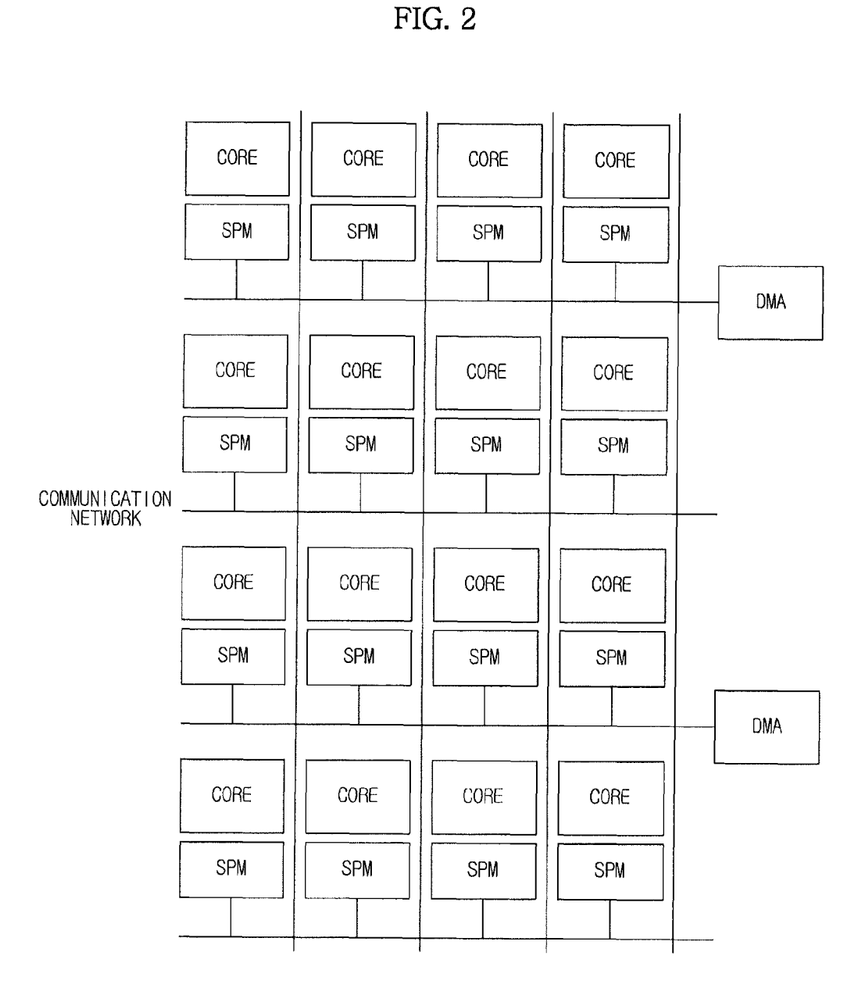

FIG. 2 illustrates exemplary cores of a multicore/manycore platform connected in mesh form.

In addition to the mesh form illustrated in FIG. 2, the cores of the multicore/manycore may have various connection types.

Referring to FIG. 2, it may be appreciated that communication speed between cores differs according to the connection types between cores. That is, communication speed between cores deployed near to each other may be faster than communication speed between cores arranged further from each other. Accordingly, when tasks are allocated to each core, arrangement should differ according to the amount of communication between the tasks. The arrangement of tasks may affect performance according to system load or a combination of applications. Therefore, to configure a system with optimal performance, the arrangement of the tasks should be changed to an environment suitable for the arrangement of the cores.

Figure 3:
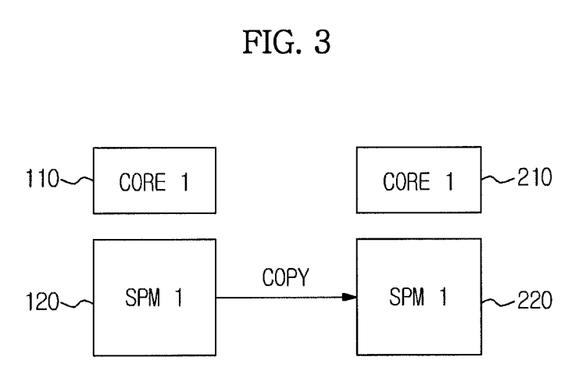
FIG. 3 and FIG. 4 illustrate an exemplary task migration in a multicore platform.
Figure 4:
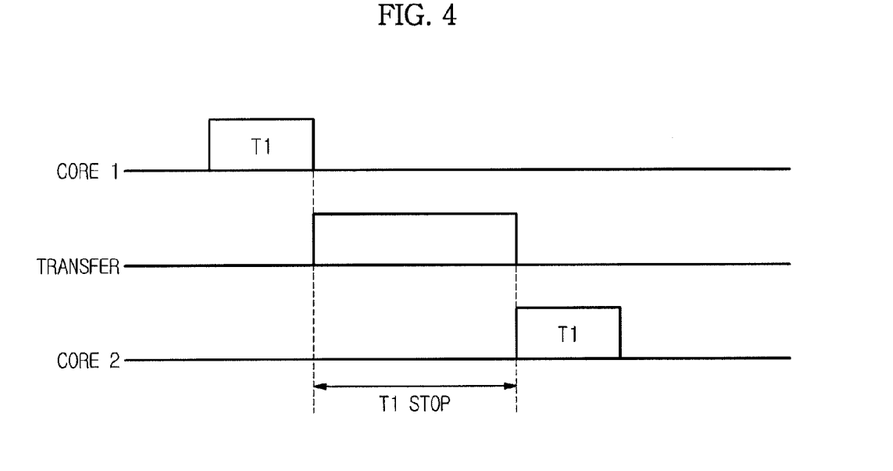

FIG. 3 and FIG. 4 illustrate exemplary task migration in a general multicore system. As illustrated in FIG. 3 and FIG. 4, to migrate a task from a first core 110 to a second core 210, the first core 110 may temporarily stop execution of the task, migrate all information indicating a current execution state of the task including the contents of a local memory 120 to the second core 210, and resume execution of the task.

Since the capacity of the local memory may be a few hundred KB according to hardware configuration, the execution of the task may be stopped while the contents of the local memory are transferred.

Figure 5:
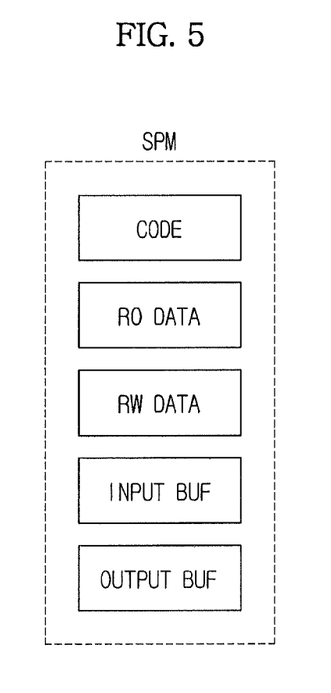
FIG. 5 illustrates a local memory according to an exemplary embodiment of the present invention.

FIG. 5 illustrates a local memory according to an exemplary embodiment of the present invention.

Although one task uses all of one local memory in FIG. 5, according to an embodiment of the present invention, it is possible for a plurality of tasks to use one local memory.

As illustrated in FIG. 5, a local memory used by a task includes a region in which codes of the task are stored, a region in which Read Only (RO) data is stored, a region in which Read Write (RW) data is stored, an input buffer, and an output buffer. The regions may correspond to a logical map of the local memory.

A task may be defined as a set of a series of instructions. Code of a task denotes instructions.

The RO data of the task refers to data which is not changed by the execution of the task among data necessary for the task executed by a core. The RW data of the task refers to data which is changed by the execution of the task among data necessary for the task executed by the core.

The input buffer stores input data for the task. The output buffer stores a result of processing the data stored in the input buffer according to execution of the task.

Operation of executing a task related to a local memory will now be described. A core reads data necessary for execution of the task from the input buffer, processes the data, and stores a processed result in the output buffer.

The state variations of the task are stored in the local memory in the form of RW data. Since code of the task and RO data are not changed according to execution of the task, they may be transferred from one core to another core irrespective of execution of the task.

Data stored in the input and output buffers are accessible by a core that is to process the data. To transfer data stored in the local memory according to attributes of the data, it is desirable that data of the same attribute be consecutively collected as illustrated in FIG. 5 but it will be understood by those skilled in the art that data of the same attribute is not necessarily contiguous.

Figure 6:
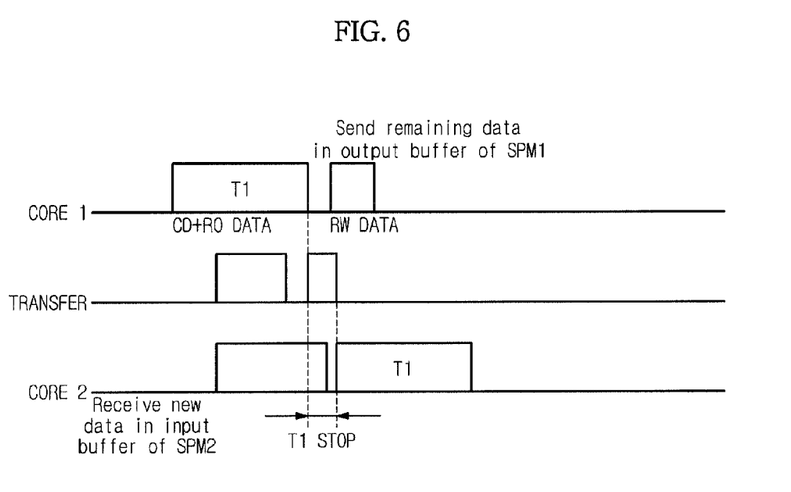
FIG. 6 illustrates task migration in a multicore platform according to an exemplary embodiment of the present invention.

FIG. 6 illustrates exemplary task migration in a multicore platform according to an exemplary embodiment of the present invention. Referring to FIG. 6, in this exemplary embodiment, code which is invariant even though a task is performed and RO data are overlapped and are migrated in advance together with the execution of the task and the execution of the task is temporarily stopped only when RW data which varies with execution of the task is migrated, thereby minimizing an interval during which the execution of the task is stopped. Input data to be processed according to the execution of the task is set to be transferred to a local memory of a new core and only input and output data remaining in a current core is processed. Accordingly, the task may be simultaneously performed in the current core and the new core in the middle of task migration. If processing of the input and output data remaining in the current core is completed, task migration is completely ended and the local memory of the current core which has been used by the task may be used by another task.

An exemplary operation of an embodiment is disclosed applying the embodiment illustrated in FIG. 6 to the multicore/manycore platform illustrated in FIG. 1. It may be assumed that a task is migrated from the first core 11 to the second core 21.

The first core 11 transfers code of a task which is being executed and RO data to the second core 21 and, together with this transfer operation, executes the task by processing already input data with respect to the task based on the code of the task, RO data, and RW data.

Upon completing processing of the already input data for the task, the first core 11 stops executing the task and transfers the RW data of the task to the second core 21. The second core 21 resumes the execution of the stopped task by processing data to be input for the task based on the code, RO data, RW data, etc. transferred from the first core 11.

A migration method of the task in the multicore platform is disclosed. A method for a soft RTOS to guarantee real time processing in the multicore platform is disclosed.

Figure 7:
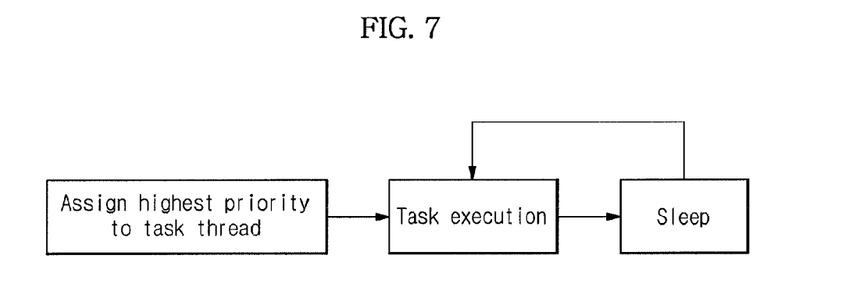
FIG. 7 and FIG. 8 illustrate an exemplary task execution structures of an RTOS.
Figure 8:
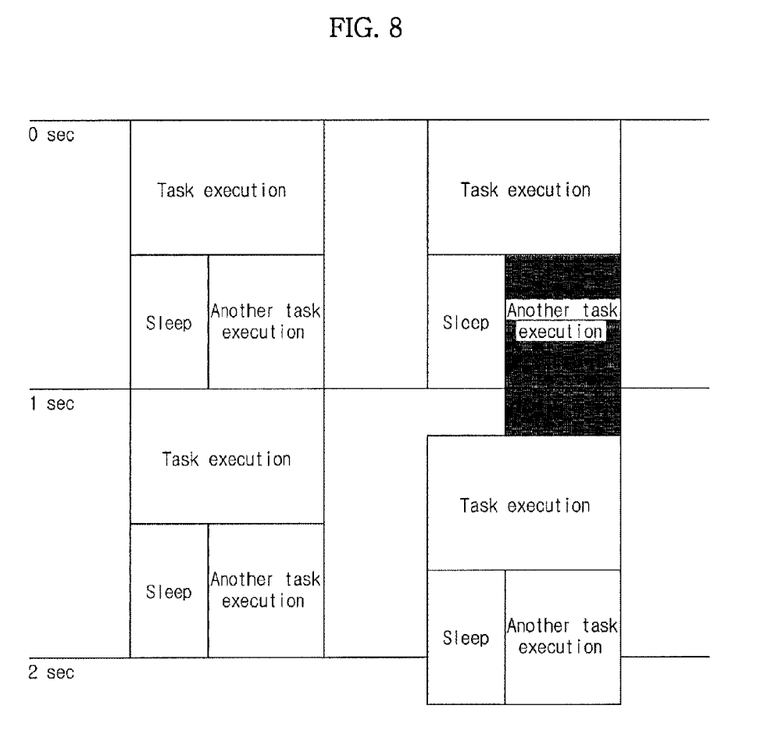

FIG. 7 illustrates an exemplary task execution structure of a general OS and an RTOS. FIG. 8 illustrates an exemplary task execution according to the task execution structure of FIG. 7.

To ensure real time in an application program level, a method may be used in which a thread to be performed in real time is assigned the highest priority and a sleep interval is inserted in the middle of the performance of the thread to prevent a system from locking up.

The thread to be performed in real time may not be affected by a program operating in a background and an OS executes other threads which do not need to be executed in real time in a sleep interval, thereby preventing system lockup.

In a case of a soft RTOS, for example, if an application is formed by the structure illustrated in FIG. 7, other threads may be occupied in the sleep interval or sleep may be released later than a scheduled sleep interval due to a scheduling problem of the OS.

That is, the sleep interval may be increased, and thus real time processing may not be guaranteed. If the sleep interval is eliminated or spinning is used in order to solve this problem, system lockup may occur.

Figure 9:
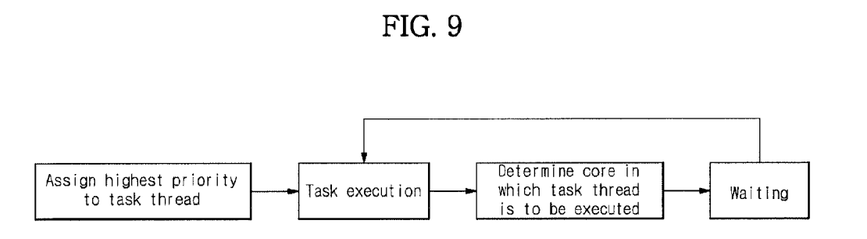
FIG. 9 and FIG. 10 illustrate an exemplary task execution structures in which a soft RTOS guarantees real time in multicore platforms according to an exemplary embodiment of the present invention.
Figure 10:
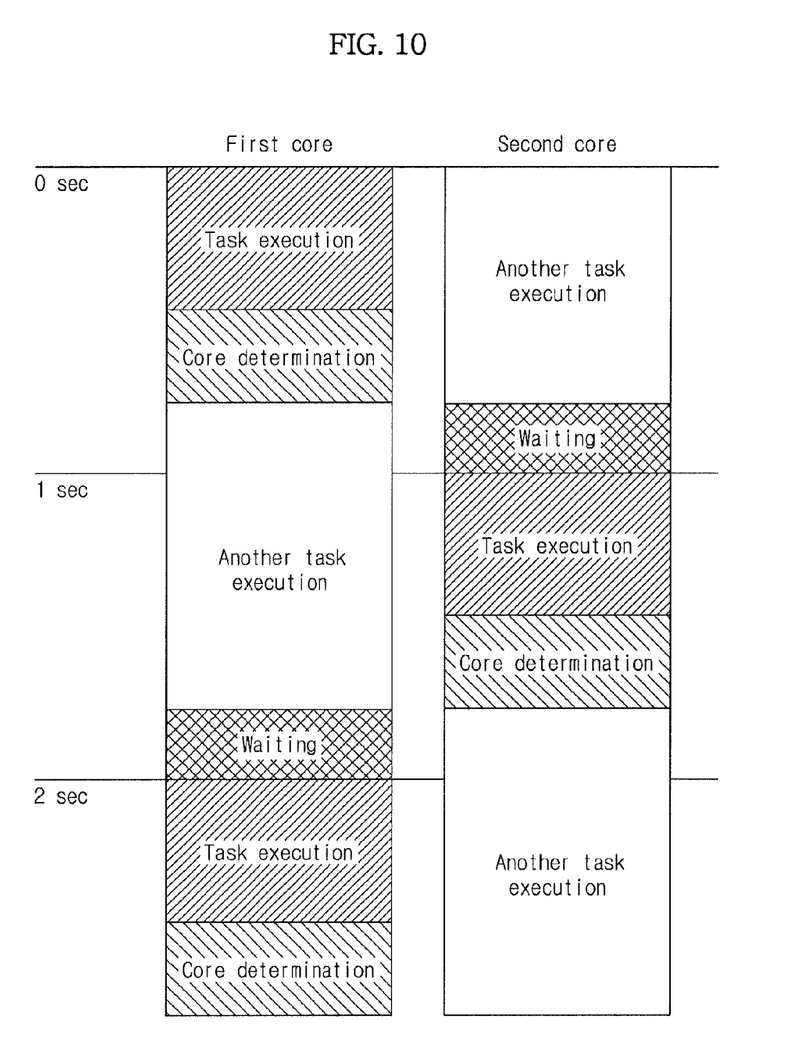

FIG. 9 illustrates an exemplary task execution structure of a soft RTOS according to an exemplary embodiment of the present invention and FIG. 10 illustrates an exemplary task execution according to the task execution structure of FIG. 9.

A method to guarantee real time of a soft RTOS according to an exemplary embodiment of the present invention assigns the highest priority to a thread which is to be performed, in real time, in any one core (hereinafter, a first core) of multiple cores.

If the thread to be performed in real time is assigned the highest priority, the corresponding thread may be performed in the first core.

If the thread is performed, a core in which a thread of a next period is to be performed is determined and the thread is transferred to the determined core (hereinafter, a second core). For thread transfer, the above-described method to migrate a task in the multicore platform may be used. To determine a core in which a thread is to be transferred, a rule to rearrange cores per period or rearrange cores per time duration may be used or a rule to rearrange cores per core load or rearranging cores per event may be used.

The second core to which a thread is to be transferred has a wait interval which stops execution of another thread which is being executed before the thread is transferred and waits until the next period arrives.

The wait interval may be comprised of spinning or a combination of sleep and spinning in order to continuously confirm the arrival of the next period.

If the thread of the first core is transferred to the second core having the wait interval and the next period at which the thread is to be performed arrives, the wait interval is ended and the thread is resumed in the second core. Although the period of one second is illustrated in FIG. 8, the period is not limited thereto.

Such a structure may eliminate the possibility that the core is occupied by other threads by using spinning or combining spinning and sleep without using sleep alone in the wait interval.

Furthermore, since a thread may be executed while varying CPU cores according to the above-described rule without a sleep interval, time which may be occupied by other threads may be assigned to all cores. That is, since a specific core is not completely occupied, system lockup is prevented.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method to guarantee real time processing of a soft real time operating system in a multicore platform, the method comprising:

assigning, by a first core, a highest priority to a first task thread, wherein the first task thread is a real time task thread configured to be executed periodically at each of a plurality of periods;

executing, by the first core, the first task thread during a first period of the plurality of periods;

determining, by the first core, a second core in which the first task thread is to be executed during a second period of the plurality of periods;

instructing, by the first core, the second core to enter a waiting period prior to transferring the first task thread thereto, wherein entering the waiting period includes spinning or a combination of spinning and sleeping by the second core until the second period occurs;

stopping execution, by the second core, of a second task thread executing on the second core in response to the first core instructing the second core to enter the waiting period and the second core subsequently entering the waiting period;

transferring the first task thread to the second core while the second core is in the waiting period; and executing, by the second core, the first task thread when the second period occurs after the first task thread is transferred thereto.

2. The method according to claim 1, wherein executing the task thread includes executing the task thread when the second period occurs.

3. The method according to claim 1, wherein the determining includes determining which one of a plurality of cores in the multicore platform to assign as the second core according to a task thread arrangement scheme.

4. The method of claim 1, further comprising:

first transferring codes and read only data associated with the task thread from the first core to the second core during execution thereof by the first core; and second transferring read-write data associated with the task thread from the first core to the second core after execution thereof by the first core is complete.

5. A non-transitory computer-readable recording medium having stored therein a program that, when executed by a multicore processor, configures the multicore processor to:

assign, by a first core, a highest priority to a first task thread, wherein the first task thread is a real time task thread configured to be executed periodically at each of a plurality of periods, execute, by the first core, the first task thread during a first period of the plurality of periods determine, by the first core, a second core in which the first task thread is to be executed during a second period of the plurality of periods, instruct, by the first core, the second core to enter a waiting period prior to transferring the first task thread thereto, wherein entering the waiting period includes spinning or a combination of spinning and sleeping by the second core until the second period occurs, stop execution, by the second core, of a second task thread executing on the second core in response to the first core instructing the second core to enter the waiting period, and the second core subsequently entering the waiting period, transfer the first task thread to the second core while the second core is in the waiting period, and execute, by the second core, the first task thread when the second period occurs after the first task thread is transferred thereto.

6. An apparatus to guarantee real time processing of a task thread in a soft real time operating system in a multicore platform, comprising:

a first core and a second core, wherein the first core is configured to, assign a highest priority to a first task thread according to a task thread arrangement scheme, wherein the first task thread is a real time task thread configured to be executed periodically at each of a plurality of periods;

execute the first task thread during a first period of the plurality of periods;

determine a second core in which the first task thread is to be executed during a second period of the plurality of periods;

instruct the second core to enter a waiting period prior to transferring the first task thread thereto, wherein entering the waiting period includes spinning or a combination of spinning and sleeping by the second core until the second period occurs;

transfer the first task thread to the second core while the second core is in the waiting period; and the second core configured to:

stop execution, by the second core, of a second task thread executing on the second core in response to the first core instructing the second core to enter the waiting period and subsequently entering the waiting period;

execute the first task thread when the second period occurs after the first task thread is transferred thereto.

7. The apparatus according to claim 6, wherein the first core executes another thread if the task thread is transferred to the second core.

8. The apparatus according to claim 6, wherein the second core executes the task thread and determines a third core in which the task thread is to be executed during a third period according to the task thread arrangement scheme.

9. The apparatus of claim 6, wherein the first core is configured to, first transfer codes and read only data associated with the task thread from the first core to the second core during execution thereof by the first core, and second transfer read-write data associated with the task thread from the first core to the second core after execution thereof by the first core is complete.

* * * * *